United States Patent
Cheverton et al.

(10) Patent No.: US 10,821,508 B2
(45) Date of Patent: Nov. 3, 2020

(54) SYSTEM AND METHODS FOR ENHANCING THE BUILD PARAMETERS OF A COMPONENT

(71) Applicant: General Electric Company, Schenectady, NY (US)

(72) Inventors: Mark Allen Cheverton, Mechanicville, NY (US); Michael Evans Graham, Slingerlands, NY (US); John Broddus Deaton, Jr., Niskayuna, NY (US); Prabhjot Singh, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 1184 days.

(21) Appl. No.: 13/968,184

(22) Filed: Aug. 15, 2013

(65) Prior Publication Data

US 2015/0048064 A1 Feb. 19, 2015

(51) Int. Cl.
| | |
|---|---|
| *B22F 3/105* | (2006.01) |
| *B23K 26/342* | (2014.01) |
| *B23K 26/03* | (2006.01) |
| *B23K 26/34* | (2014.01) |

(52) U.S. Cl.
CPC .......... *B22F 3/1055* (2013.01); *B23K 26/032* (2013.01); *B23K 26/34* (2013.01); *B23K 26/342* (2015.10); *B22F 2003/1056* (2013.01); *B22F 2003/1057* (2013.01); *Y02P 10/25* (2015.11)

(58) Field of Classification Search
CPC .. B23K 26/342; B23K 26/032; B23K 26/034; B23K 26/34; B22F 3/1055

USPC ................................................ 219/121.63
See application file for complete search history.

(56) References Cited

U.S. PATENT DOCUMENTS

| | | | |
|---|---|---|---|
| 6,040,550 A * | 3/2000 | Chang | B23K 26/032 219/121.63 |
| 7,423,236 B2 | 9/2008 | Suh | |
| 7,705,264 B2 | 4/2010 | Hoebel et al. | |
| 8,240,046 B2 | 8/2012 | Peretti et al. | |
| 2003/0127436 A1 | 7/2003 | Darrah et al. | |
| 2007/0010803 A1* | 1/2007 | Bischoff | A61F 9/00825 606/4 |
| 2009/0206065 A1 | 8/2009 | Kruth et al. | |
| 2010/0174392 A1 | 7/2010 | Fink et al. | |
| 2011/0061591 A1 | 3/2011 | Stecker | |
| 2011/0114839 A1 | 5/2011 | Stecker et al. | |

(Continued)

OTHER PUBLICATIONS

Tang, Lie et al, Melt Pool Temperature Control for Laser Metal Deposition Processes—Part I: Online Temperature Control, Journal of Manufacturing Science and Engineering, Feb. 2010, 9 pages, vol. 132, ASME.

(Continued)

*Primary Examiner* — Erin E McGrath
(74) *Attorney, Agent, or Firm* — Armstrong Teasdale LLP

(57) ABSTRACT

A direct metal laser melting (DMLM) system for enhancing build parameters of a DMLM component includes a confocal optical system configured to measure at least one of a melt pool size and a melt pool temperature. The DMLM system further includes a computing device configured to receive at least one of the melt pool size or the melt pool temperature from the confocal optical system. Furthermore, the DMLM system includes a controller configured to control the operation of a laser device based on at least one build parameter.

15 Claims, 4 Drawing Sheets

(56) References Cited

U.S. PATENT DOCUMENTS

| | | | |
|---|---|---|---|
| 2011/0240607 A1 | 10/2011 | Stecker et al. | |
| 2013/0168902 A1* | 7/2013 | Herzog | B22F 3/1055 |
| | | | 264/401 |
| 2014/0223583 A1* | 8/2014 | Wegner | G06F 17/50 |
| | | | 726/33 |

OTHER PUBLICATIONS

Craeghs, Tom et al, Determination of geometrical factors in Layerwise Laser Melting using optical process monitoring, Optics and Lasers in Engineering, 2011, pp. 1440-1446, vol. 49, Elsevier, Ltd.

Hu, Dongming et al, Sensing, modeling and control for laser-based additive manufacturing, International Journal of Machine Tools & Manufacture, 2003, pp. 51-60, vol. 43, Elsevier Science Ltd.

R•Mer, Gerardus Richardus Benardus Engelina, Modelling and Control of Laser Surface Treatment, 1999, 205 pages, G.R.B.E. Ramer, Eibergen, The Netherlands.

* cited by examiner

SYSTEM AND METHODS FOR ENHANCING THE BUILD PARAMETERS OF A COMPONENT

BACKGROUND

The subject matter disclosed herein relates generally to additive manufacturing systems and, more particularly, to methods and systems for enhancing the build parameters for making additive manufactured components.

At least some additive manufacturing systems involve the buildup of a metal component to make a net, or near net shape component. This method can produce complex components from expensive materials at a reduced cost and with improved manufacturing efficiency. However, some known additive manufacturing systems, such as Direct Metal Laser Melting (DMLM) systems, fabricate components using a laser device and a powder material, such as a powdered metal. In some known DMLM systems, component quality may be reduced due to excess heat and/or variation in heat being transferred to the metal powder by the laser device within the melt pool.

In some known DMLM systems, component surface quality, particularly overhang or downward facing surfaces, is reduced due to the variation in conductive heat transfer between the powdered metal and the surrounding solid material of the component. As a result, local overheating may occur, particularly at the overhang surfaces. The melt pool produced by the laser device may become too large resulting in the melted metal spreading into the surrounding powdered metal as well as the melt pool penetrating deeper into the powder bed, pulling in additional powder into the melt pool. The increased melt pool size and depth, and the flow of molten metal may generally result in a poor surface finish of the overhang or downward facing surface.

In addition, in some known DMLM systems, the component's dimensional accuracy and small feature resolution may be reduced due to melt pool variations because of the variability of thermal conductivity of the subsurface structures and metallic powder. As the melt pool size varies, the accuracy of printed structures can vary, especially at the edges of features.

Both of these challenges are geometry dependent. As a result, an adaptive build parameter needs to be used for every build vector to maintain control over the melt pool size. By enhancing the build parameters of the component, the quality of the surface finish throughout the printed component as well as the shape accuracy of the part may be improved. In addition, small feature resolution, often lost because of varying thermal conductivity, can also be enhanced.

BRIEF DESCRIPTION

In one aspect, a direct metal laser melting (DMLM) system is provided. The DMLM system includes a confocal optical system configured to measure at least one of a melt pool size and a melt pool temperature. The DMLM system further includes a computing device configured to receive at least one of the melt pool size and the melt pool temperature from the confocal optical system. Furthermore, the DMLM system includes a controller configured to control the operation of a laser device based on at least one build parameter.

In another aspect, a method for enhancing build parameters of a direct metal laser melting (DMLM) component to improve component quality is provided. The method includes generating a melt pool based on a build parameter. The method further includes monitoring the melt pool to measure at least one of a size and a temperature of the melt pool. In addition, the method includes generating a correction factor based on at least one of the size and the temperature of the melt pool. Furthermore, the method includes modifying the build parameter based on the correction factor to achieve a desired physical property of the DMLM component.

In yet another aspect, a method for generating enhanced build parameters for fabricating a component using a direct metal laser melting (DMLM) system is provided. The method includes generating a melt pool at a plurality of build vectors based on a set of build parameters. The method also includes monitoring the melt pool to measure at least one of a size and a temperature of the melt pool at a respective build vector of the set of build vectors. Furthermore, the method includes comparing at least one of the size and the temperature of the melt pool at a respective build vector to a calibration model, and modifying the set of build parameters to achieve a set of desired physical properties of the DMLM component. In addition, the method includes transmitting the modified set of build parameters to a controller coupled to the DMLM system.

DRAWINGS

These and other features, aspects, and advantages of the present disclosure will become better understood when the following detailed description is read with reference to the accompanying drawings in which like characters represent like parts throughout the drawings, wherein.

Figure 1:
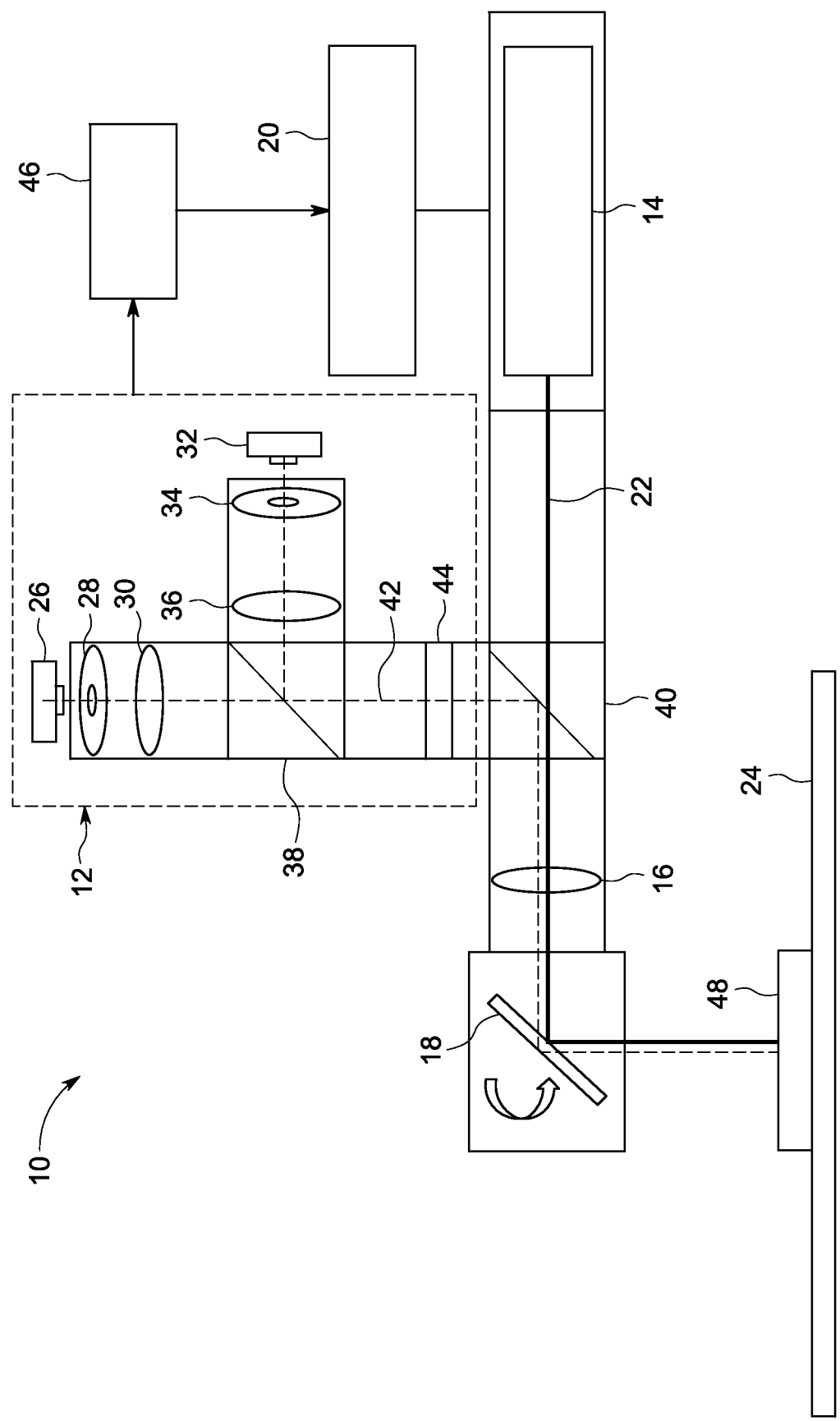
FIG. 1 is a schematic view of an exemplary direct metal laser melting (DMLM) system including an exemplary confocal optical sensing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The systems and methods described herein relate to enhancing the build parameters of a direct metal laser melting (DMLM) component to improve component quality. A DMLM system includes attaching an optical system to a DMLM machine. The optical system includes at least a confocal optic system, i.e. a high numerical aperture (NA) lens and a pinhole aperture optically coupled with a photomultiplier tube (PMT) or photodiode (PD) to limit an amount of collateral illumination (sparks and plasma over a melt pool as well as neighboring melt pools that may still be glowing). In operation, a three dimensional (3D) computer model is used by a DMLM machine to fabricate a component. At least one laser device of the DMLM machine heats a powdered metal to form a melt pool. A controller coupled to the DMLM machine controls operation of a galvanometer, which guides the laser device output, and thereby the melt pool, along a predetermined path in the powdered metal. As the laser traverses the predetermined path, the melt pool cools, forming a hardened metal structure. The optical system monitors and records the size of the melt pool as the DMLM machine forms each layer of the component. The size of the melt pool is correlated to a respective build vector used by a controller of the DMLM machine to form the component. The melt pool data is compared to a calibration model of the DMLM machine and a respective correction factor is generated for each build vector of the component. The correction factors are applied to the respective build vectors of the component and the enhanced build parameters are transmitted to the DMLM machine controller. The DMLM machine is operated with the enhanced build parameters to fabricate a new component. Monitoring the melt pool size and correlating it to a respective build vector facilitates enhancing the build parameters used by the DMLM machine to fabricate the component. Enhancing the build parameters further facilitates improving the quality of the component, e.g. the physical properties such as dimensions, feature resolution, overhang quality, and surface finish.

FIG. 1 is a schematic view of an exemplary direct metal laser melting (DMLM) system 10 including an exemplary confocal optical sensing system 12. In the exemplary embodiment, DMLM system 10 includes a laser device 14 optically coupled to optics 16 and galvanometers 18 for controlling the scanning of laser device 14. Alternatively, DMLM system 10 may include more than one laser device. For example, without limitation, an alternative DMLM system may have a first laser device having a first power and a second laser device having a second power different from the first laser power, or an alternative DMLM system may have at least two laser devices having substantially the same power output. However, DMLM system 10 may include any combination of laser devices that permit DMLM 10 to operate as described herein.

In the exemplary embodiment, DMLM system 10 also includes a computer control system, or controller 20. Galvanometers 18 are controlled by controller 20 and deflect a beam 22 of laser device 14 along a predetermined path on a powder bed 24. Galvanometers 18 may include two-dimension (2D) scan galvanometers, three-dimension (3D) scan galvanometers, dynamic focusing galvanometers, and/or any other galvanometer system that may be used to deflect beam 22 of laser device 14.

DMLM system 10 is operated to fabricate a component 48 by a layer-by-layer manufacturing process. Component 48 is fabricated from an electronic representation of the 3D geometry of component 48. The electronic representation may be produced in a computer aided design (CAD) or similar file. The CAD file of component 48 is converted into a layer-by-layer format that includes a plurality of build parameters 49 for each layer. In the exemplary embodiment, component 48 is arranged electronically in a desired orientation relative to the origin of the coordinate system used in DMLM system 10. The geometry of component 48 is sliced into a stack of layers of a desired thickness, such that the geometry of each layer is an outline of the cross-section through component 48 at that particular layer location. A "toolpath" or "toolpaths" are generated across the geometry of a respective layer. Build parameters 49 are applied along the toolpath or toolpaths to fabricate that layer of component 48 from the material used to construct component 48. The steps are repeated for each respective layer of component 48 geometry. Once the process is completed, an electronic computer build file 54 (or files) (FIG. 2) is generated including all of the layers. Build file 54 is loaded into controller 20 of DMLM system 10 to control the system during fabrication of each layer.

After build file 54 is loaded into controller 20, DMLM system 10 is operated to generate component 48 by implementing the layer-by-layer manufacturing process, such as a direct metal laser melting method. The exemplary layer-by-layer additive manufacturing process does not use a pre-existing article as the precursor to the final component, rather the process produces component 48 from a raw material in a configurable form, such as a powder. For example, without limitation, a steel component can be additively manufactured using a steel powder. DMLM system 10 enables fabrication of components using a broad range of materials, for example, without limitation, metals, ceramics, and polymers.

As used herein, the term "parameter" refers to characteristics that can be used to define the operating conditions of DMLM system 10, such as a power output of laser device 14, a vector scanning speed of laser device 14, a raster power output of laser device 14, a raster scanning speed of laser device 14, a raster tool path of laser device 14, and a contour power output of laser device 14 within DMLM system 10. The parameters may be initially input by a user into controller 20. The parameters represent a given operating state of DMLM system 10. In general, during raster scanning, beam 22 is scanned sequentially along a series of substantially straight lines spaced apart and parallel to each other. During vector scanning, beam 22 is generally scanned sequentially along a series of substantially straight lines or vectors, where the orientations of the vectors relative to each other may vary. In general, the ending point of one vector may coincide with the beginning point of the next vector. Vector scanning is generally used to define the outer contours of a component, whereas raster scanning is generally used to "fill" the spaces enclosed by the contour, where the component is solid.

Figure 2:
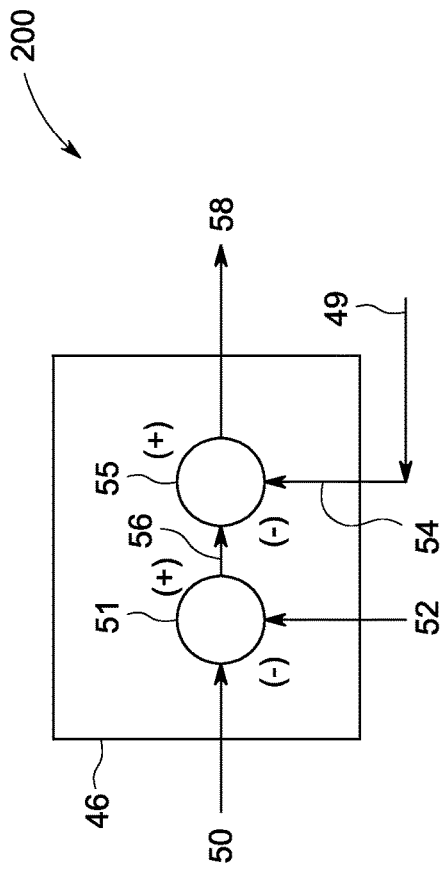
FIG. 2 is a schematic view of an exemplary control architecture that may be used with a computing device used with the DMLM system shown in FIG. 1.

In the exemplary embodiment, confocal optical sensing system 12 includes at least one high numerical aperture objective lens 30 and pinhole aperture 28. Optical system 12 also includes at least one optical sensor 26. In the exemplary embodiment, optical system 12 includes two optical sensors 26 and 32, coupled to two confocal optical systems, i.e. objective lenses 30 and 36 and pinhole apertures 28 and 34, respectively. Pinhole apertures 28 and 34 are configured to limit or reduce the amount of out-of-focus emissions from an optical signal 42 from reaching optical sensors 26 and 32, respectively. The size of pinhole apertures 28 and 34 is determined based on calibration data acquired from DMLM system 10. In general, pinhole apertures 28 and 34 are sized to correspond to a melt pool area 50 (FIG. 2). Alternatively, pinhole apertures 28 and 34 may dimensioned to any size that permits optical system 12 to operate as described herein.

In the exemplary embodiment, optical system 12 includes one or more beam splitters 38 and 40 for dividing optical signal 42 transmitted by optical system 12 towards the at least two optical sensors 26 and 32. Any combination of optical sensors 26 and 32 can be used. In the exemplary embodiment, optical sensors 26 and 32 are photomultiplier tubes (PMTs). Alternatively, optical sensors 26 and 32 may be any one of several known optical sensors that permit optical system 12 to operate as described herein. For example, without limitation, optical sensors 26 and 32 may be any one of a photodiode (PD), a pyrometer, a camera, or the like. In the exemplary embodiment, optical sensors 26 and 32 are configured to sample data at a data acquisition rate in the range between about 50 kilohertz (kHz) and about 250 kHz, and more particularly, in the range between about 100 kHz and about 200 kHz, and preferably, at a data acquisition rate of about 200 kHz.

While optical system 12 is described as including optical sensors for receiving optical signal 42, it should be noted that use of the term "optical" is not to be equated with the term "visible." Optical system 12 as described herein is configured to capture a wide spectral range. Optical sensors 26 and 32 are sensitive detectors of light with wavelengths in the ultraviolet (about 200-400 nanometers (nm)), visible (about 400-700 nm), near-infrared (about 700-1200 nm), and infrared ranges (about 1200-10000 nm) of the electromagnetic spectrum. The wavelengths emitted by a body depend on the temperature of the body. Accordingly, optical system 12 is capable of monitoring and measuring both a size and a temperature of a body.

In the exemplary embodiment, optical system 12 includes an optical filter 44. Optical filter 44 can be used to filter specific portions of the spectrum comprising optical signal 42. Optical filter 44 provides the ability to block wavelengths substantially similar to beam 22 from optical signal 42, and/or to permit specific wavelengths to pass. Alternatively, filters can be placed in the optical path before beam splitter 38, thereby affecting optical signal 42 before it reaches any of optical sensors 26 and 32, or filters can be placed after beam splitter 38 to affect only the portion of optical signal 42 that reaches optical sensor 26 or optical sensor 32, respectively. Alternatively, spectral properties of beam splitter 38 may be altered to provide a desired optical filtering performance.

In the exemplary embodiment, controller 20 is one of any type of controller typically provided by a manufacturer of DMLM system 10 to control operation of DMLM system 10. Controller 20 may be a computer system that includes at least one processor (not shown) and at least one memory device (not shown) that executes operations to control the operation of DMLM system 10 based at least partially on instructions from human operators. Controller 20 may include, for example, a 3D model of component 48 to be fabricated by DMLM system 10. Operations executed by controller 20 may include controlling power output of laser device 14 and adjusting galvanometers 18 to control the scanning speed of laser device 14 within DMLM system 10.

In the exemplary embodiment, computing device 46 operates at least partially as a data acquisition device and monitors the operation of DMLM system 10 during initial fabrication of component 48. Computing device 46 may be a computer system that includes at least one processor that executes operations to operate DMLM system 10 based at least partially on inputs from optical sensors 26 and 32. Computing device 46 may include, for example, a calibration model 52 of DMLM system 10 and build file 54.

FIG. 2 is a schematic view of an exemplary control architecture 200 that may be used with computing device 46 (shown in FIG. 1) used with DMLM system 10 (shown in FIG. 1). In the exemplary embodiment, computing device 46 receives as input melt pool area 50. As described above, computing device 46 also includes calibration model 52 of DMLM system 10 and build file 54. As described in more detail below, computing device 46 is configured to compare melt pool area 50 to calibration model 52 using a comparison module 51 to generate a correction factor 56. Correction factor 56 is used by computing device 46 to modify build model 54 using a summing module 55 and output a corrected build model 58. Build model 54 receives as input build parameters 49.

Figure 3:
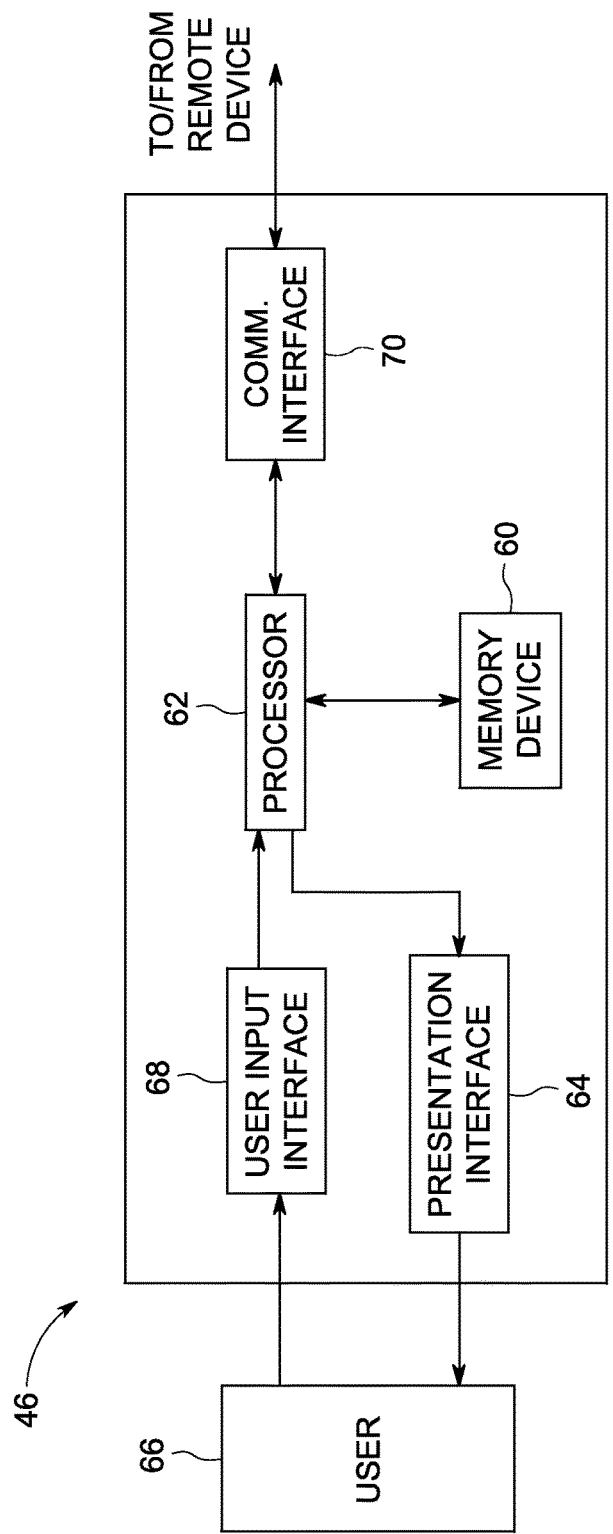
FIG. 3 is a block diagram of the computing device that may be used with the DMLM system shown in FIG. 1.

FIG. 3 is a block diagram of computing device 46 (shown in FIG. 1) that may be used to perform data acquisition and monitoring of any piece of equipment, system, and process, such as, without limitation, acquiring data and monitoring geometric conditions of component 48 during fabrication by DMLM system 10. In the exemplary embodiment, computing device 46 includes a memory device 60 and a processor 62 coupled to memory device 60. Processor 62 may include one or more processing units, such as, without limitation, a multi-core configuration. In the exemplary embodiment, processor 62 includes a field programmable gate array (FPGA). Alternatively, processor 62 may be any type of processor that permits computing device 46 to operate as described herein. In some embodiments, executable instructions are stored in memory device 60. Computing device 46 is configurable to perform one or more operations described herein by programming processor 62. For example, processor 62 may be programmed by encoding an operation as one or more executable instructions and providing the executable instructions in memory device 60. In the exemplary embodiment, memory device 60 is one or more devices that enable storage and retrieval of information such as executable instructions or other data. Memory device 60 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

As used herein, the term "computer" and related terms, such as, "computing device", are not limited to integrated circuits referred to in the art as a computer, but rather broadly refers to a microcontroller, a microcomputer, a field programmable gate array (FPGA), a programmable logic controller (PLC), an application specific integrated circuit, and other programmable circuits, and these terms are used interchangeably herein.

Memory device 60 may be configured to store build parameters 49 including, without limitation, real-time and historical build parameter values, or any other type of data. In some embodiments, processor 62 removes or "purges" data from memory device 60 based on the age of the data. For example, processor 62 may overwrite previously recorded and stored data associated with a subsequent time or event. In addition, or alternatively, processor 62 may remove data that exceeds a predetermined time interval. In addition, memory device 60 includes, without limitation, sufficient data, algorithms, and commands to facilitate monitoring and measuring of build parameters 49 and the geometric conditions of component 48 being fabricated by DMLM system 10.

As used herein, the term "real-time" refers to at least one of the time of occurrence of the associated events, the time of measurement and collection of predetermined data, the time to process the data, and the time of a system response to the events and the environment. In the embodiments described herein, these activities and events may occur substantially instantaneously.

In some embodiments, computing device 46 includes a presentation interface 64 coupled to processor 62. Presentation interface 64 presents information, such as the operating conditions of DMLM system 10, to a user 66. In one embodiment, presentation interface 64 includes a display adapter (not shown) coupled to a display device (not shown), such as a cathode ray tube (CRT), a liquid crystal display (LCD), an organic LED (OLED) display, or an "electronic ink" display. In some embodiments, presentation interface 64 includes one or more display devices. In addition, or alternatively, presentation interface 64 includes an audio output device (not shown), for example, without limitation, an audio adapter or a speaker (not shown).

In some embodiments, computing device 46 includes a user input interface 68. In the exemplary embodiment, user input interface 68 is coupled to processor 62 and receives input from user 66. User input interface 68 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 64 and user input interface 68.

In the exemplary embodiment, a communication interface 70 is coupled to processor 62 and is configured to be coupled in communication with one or more other devices, such as optical sensors 26 and 32, and to perform input and output operations with respect to such devices while performing as an input channel. For example, communication interface 70 may include, without limitation, a wired network adapter, a wireless network adapter, a mobile telecommunications adapter, a serial communication adapter, or a parallel communication adapter. Communication interface 70 may receive a data signal from or transmit a data signal to one or more remote devices. For example, in an alternative embodiment, communication interface 70 of computing device 46 may transmit/receive a data signal to/from controller 20.

Presentation interface 64 and communication interface 70 are both capable of providing information suitable for use with the methods described herein, such as, providing information to user 66 or processor 62. Accordingly, presentation interface 64 and communication interface 70 may be referred to as output devices. Similarly, user input interface 68 and communication interface 70 are capable of receiving information suitable for use with the methods described herein and may be referred to as input devices.

Described herein is a method for enhancing build parameters 49 for making component 48 using DMLM system 10. The method described facilitates improving the quality of the surface finish on downward facing surfaces of component 48. In addition, the method facilitates improving small feature resolution often lost because of varying thermal conductivity within powder bed 24 during component fabrication. The method may be implemented as a discrete process to adjust component 48 build parameters in DMLM system 10 during an initial build of component 48.

Figure 4:
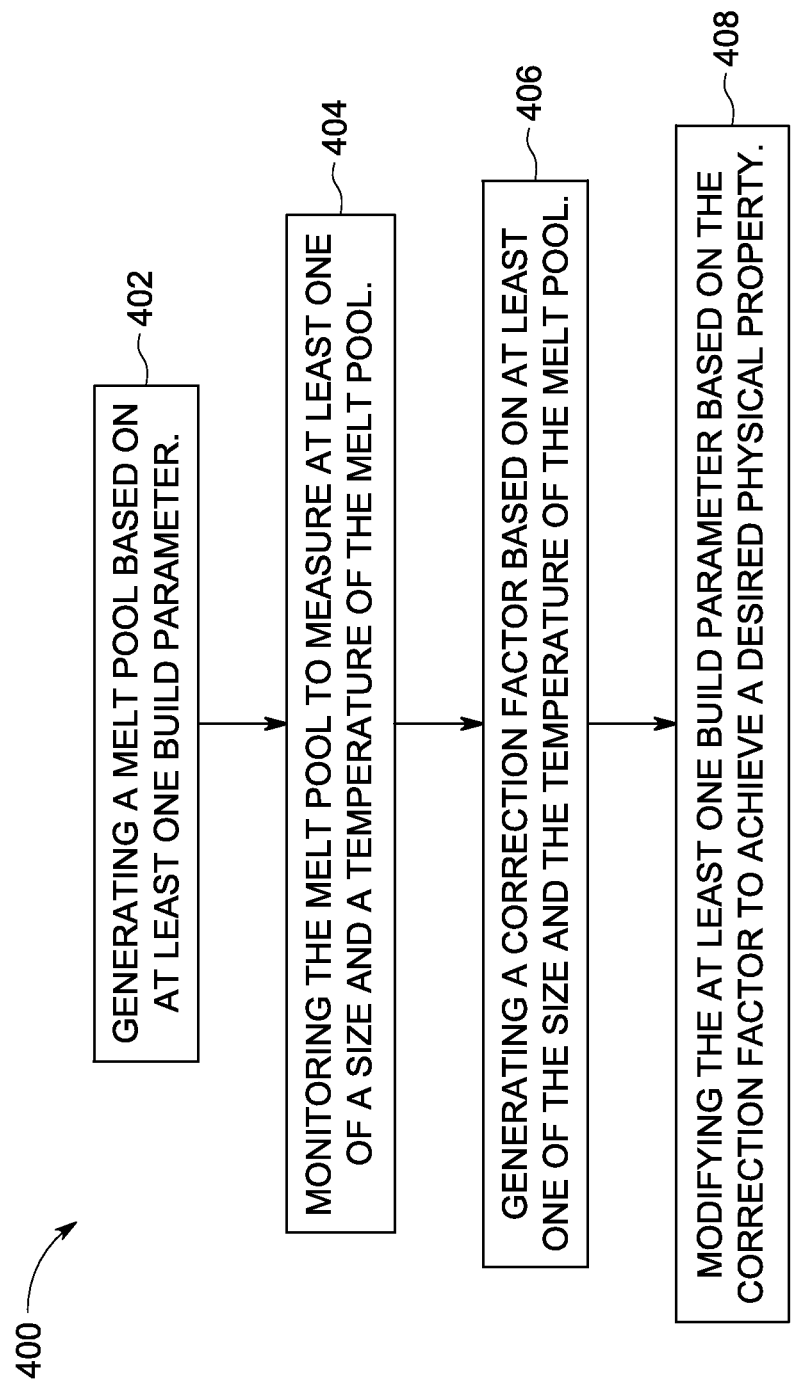
FIG. 4 is a flow chart of an exemplary method that may be implemented to adjust build parameter control during operation of the DMLM system shown in FIG. 1.

FIG. 4 is a flow chart of an exemplary method 400 that may be implemented to adjust build parameter control during operation of DMLM system 10 (shown in FIG. 1). To facilitate enhancing component build parameters 49, in the exemplary embodiment, controller 20 controls DMLM system 10 and directs beam 22 from laser device 14 onto powder bed 24 to generate 402 the melt pool area 50. Controller 20 controls the movement of galvanometers 18 to scan beam 22 across powder bed 24 according to a predetermined path defined by build file 54 for component 48. Optical system 12 monitors 404 the melt pool area 50 to measure a size and/or a temperature of the melt pool area 50 as beam 22 is scanned across powder bed 24. In the exemplary embodiment, a plurality of optical sensors 26 and 32 monitor and measure various geometric conditions of the melt pool 50 created by laser device 14 of DMLM system 10. The geometric condition monitored by optical sensors 26 and 32 is a measured value indicative of the area 50 of the melt pool. After measuring the melt pool area 50, a computing device 46 (shown in FIG. 1) receives the measured values.

In the exemplary embodiment, computing device 46 includes, for example, calibration model 52 of the DMLM system 10, comprising melt pool size data at various operating conditions of DMLM system 10. Furthermore, computing device 46 receives an input build file 54 for component 48 being fabricated. Computing device 46 correlates melt pool area 50 to the respective build vectors of build file 54 used by DMLM system 10. Computing device 46 then uses comparison module 51 to compare the melt pool area 50 at a specific build vector to calibration model 52 of DMLM system 10 to determine a difference value between a nominal melt pool area and the measured melt pool area of DMLM system 10 to generate 406 the correction factors 56. Build file 54 is modified 408 with correction factors 56 using summing module 55 to generate the corrected build file 58. Corrected build file 58 is subsequently used by DMLM system 10 to fabricate additional components with improved physical properties, such as, without limitation, component dimensions, surface finish, overhang quality, and feature resolution.

As described previously, the exemplary method 400 for enhancing build parameters 49 for making component 48 using DMLM system 10 may be implemented as a discrete process to adjust component 48 build parameters 49 in DMLM system 10 during an initial build of component 48. In addition to the discrete process implementation, method 400 may be implemented as an automatically repeating process. One advantage of automating and repeating method 400 during operation of DMLM system 10 is that the plurality of correction factors 56 can be repeatedly adjusted to facilitate accurately adjusting component 48 build parameters 49 in DMLM system 10 until a desired quality of component 48 is reached.

Figure 5:
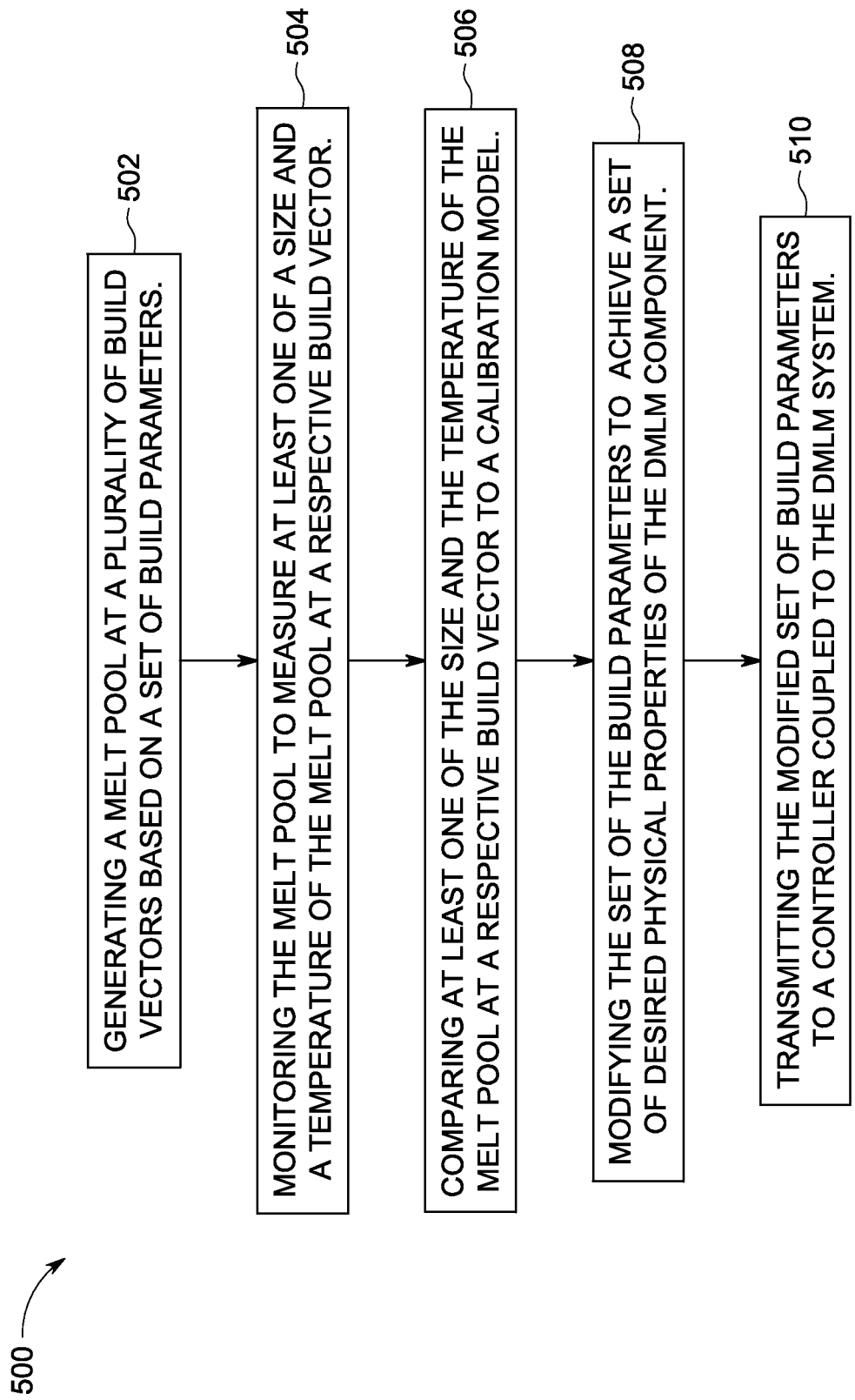
FIG. 5 is a flow chart of an alternative exemplary method that may be implemented to adjust build parameter control during operation of the DMLM system shown in FIG. 1.

FIG. 5 is a flow chart of an alternative exemplary method 500 that may be implemented to adjust build parameter control during operation of DMLM system 10 (shown in FIG. 1). To facilitate enhancing component 48 build parameters 49, in the exemplary embodiment, controller 20 controls DMLM system 10 and directs beam 22 from laser device 14 onto powder bed 24 to generate 502 melt pool area 50 at a plurality of build vectors based on a set of build parameters 49. Controller 20 controls the movement of galvanometers 18 to scan beam 22 across powder bed 24 according to a predetermined path defined by build file 54 for component 48. Optical system 12 monitors 504 the melt pool area 50 to measure a size and/or a temperature of the melt pool area 50 at a respective build vector as beam 22 is scanned across powder bed 24. A plurality of optical sensors 26 and 32 monitor and measure the area and/or temperature of the melt pool 50 created by laser device 14 of DMLM system 10. After measuring the melt pool area 50 and/or temperature, a computing device 46 (shown in FIG. 1) receives the measured values at the respective build vectors and compares 506 them to the calibration model 52 using comparison module 51. Computing device 46 then modifies 508 the set of build vectors of build file 54 using summing module 55 to achieve improved physical properties, such as, without limitation, component dimensions, surface finish, overhang quality, and feature resolution. After modifying build parameters 49 of build file 54, computing device 46 transmits 510 corrected build file 58 to controller 20 coupled to DMLM system 10.

Alternative method 500 for enhancing build parameters 49 for making component 48 using DMLM system 10 may be implemented as a discrete process to adjust component 48 build parameters 49 in DMLM system 10 during an initial build of component 48. In addition to the discrete process implementation, method 500 may be implemented as an automatically repeating process. One advantage of automating and repeating method 500 during operation of DMLM system 10 is that the build parameters 49 of build file 54 can be repeatedly adjusted until a desired quality of component 48 is reached.

The systems and methods as described herein facilitate enhancing the build parameters used by the DMLM machine to fabricate component. Specifically, the systems and methods described facilitate monitoring a melt pool size and correlating the size to a respective build vector of the component build file, then adjusting the build parameters based on a comparison of the melt pool size with a calibration model. Enhancing the build parameters facilitates improving the quality of the component, e.g. the physical properties such as dimensions, feature resolution, overhang quality, and surface finish. Therefore, in contrast to known DMLM systems that do not adjust the component build parameters, the systems, and methods described herein facilitate improving quality of the surface finish on downward facing surfaces of the component. In addition, small feature resolution, often lost because of varying thermal conductivity, can also be enhanced.

An exemplary technical effect of the methods and systems described herein includes at least one of: (a) monitoring the melt pool to measure at least one of a size and a temperature of the melt pool; (b) generating a correction factor based on at least one of the size and the temperature of the melt pool; and (c) modifying the build parameter based on the correction factor to achieve a desired physical property.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with electronic components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for generating a modified build file for a direct metal laser melting (DMLM) component formed by a DMLM system, the method comprising:
   generating a melt pool with a laser device at a plurality of build vectors based on a first set of build parameters contained within an initial build file;
   monitoring the melt pool using a photomultiplier tube to measure a size of the melt pool at a specific build vector of the plurality of build vectors;
   comparing the measured size of the melt pool at the specific build vector to a calibration model of the DMLM system and the initial build file;
   generating a correction factor based on a difference between the measured size of the melt pool at the specific build vector and the calibration model;
   modifying at least one build parameter of the first set of build parameters in the initial build file based on the correction factor to generate a second set of build parameters contained within a modified build file, the second set of build parameters corresponding to a desired physical property of the DMLM component;
   transmitting the modified build file to a controller coupled to the DMLM system.

2. The method in accordance with claim 1, wherein monitoring the melt pool further comprises monitoring the melt pool with at least one of an additional photomultiplier tube, a photodiode, a camera, or a pyrometer.

3. The method in accordance with claim 1, wherein generating a melt pool based on at least one build parameter comprises generating the melt pool with the laser device based on at least one of a power output of the laser device, a vector scanning speed of the laser device, a raster power output of the laser device, a raster scanning speed of the laser device, a raster tool path of the laser device, or a contour power output of the laser device.

4. The method in accordance with claim 1, wherein the desired physical property includes at least one of a component dimension, a surface finish, an overhang quality, or a feature resolution.

5. The method in accordance with claim 1, wherein monitoring the melt pool using the photomultiplier tube comprises sampling data using the photomultiplier tube at a data acquisition rate between 50 kilohertz and 250 kilohertz.

6. The method in accordance with claim 5, wherein sampling data occurs at a data acquisition rate between 100 kilohertz and 200 kilohertz.

7. The method in accordance with claim 1, wherein monitoring the melt pool further comprises monitoring the melt pool to measure a temperature of the melt pool at a respective build vector.

8. A method for generating a modified build file for a direct metal laser melting (DMLM) component formed by a DMLM system, the method comprising:
  generating a melt pool with a laser device at a plurality of build vectors based on a first set of build parameters contained within an initial build file;
  monitoring the melt pool using an optical sensor to measure a size of the melt pool at a specific build vector of the plurality of build vectors, the optical sensor sampling data at a data acquisition rate in a range of between 50 kilohertz and 250 kilohertz;
  comparing the measured size of the melt pool at the specific build vector to a calibration model of the DMLM system and the initial build file;
  generating a correction factor based on a difference between the measured size of the melt pool at the specific build vector and the calibration model;
  modifying at least one build parameter of the first set of build parameters in the initial build file based on the correction factor to generate a second set of build parameters contained within a modified build file, the second set of build parameters corresponding to a desired physical property of the DMLM component;
  transmitting the modified build file to a controller coupled to the DMLM system.

9. The method in accordance with claim 8, wherein monitoring the melt pool using an optical sensor comprises monitoring the melt pool with at least one of a photomultiplier tube, a photodiode, a camera, or a pyrometer.

10. The method in accordance with claim 8, wherein generating a melt pool based on at least one build parameter comprises generating the melt pool with the laser device based on at least one of a power output of the laser device, a vector scanning speed of the laser device, a raster power output of the laser device, a raster scanning speed of the laser device, a raster tool path of the laser device, or a contour power output of the laser device.

11. The method in accordance with claim 8, wherein the desired physical property includes at least one of a component dimension, a surface finish, an overhang quality, or a feature resolution.

12. The method in accordance with claim 8, wherein sampling data occurs at a data acquisition rate between 100 kilohertz and 200 kilohertz.

13. The method in accordance with claim 8, wherein monitoring the melt pool further comprises monitoring the melt pool to measure a temperature of the melt pool at a respective build vector.

14. The method in accordance with claim 1, wherein monitoring the melt pool using a photomultiplier tube to measure a size of the melt pool at a specific build vector comprises measuring an area of the melt pool.

15. The method in accordance with claim 9, wherein monitoring the melt pool using an optical sensor comprises monitoring the melt pool with a photomultiplier tube.

* * * * *